UNITED STATES PATENT OFFICE.

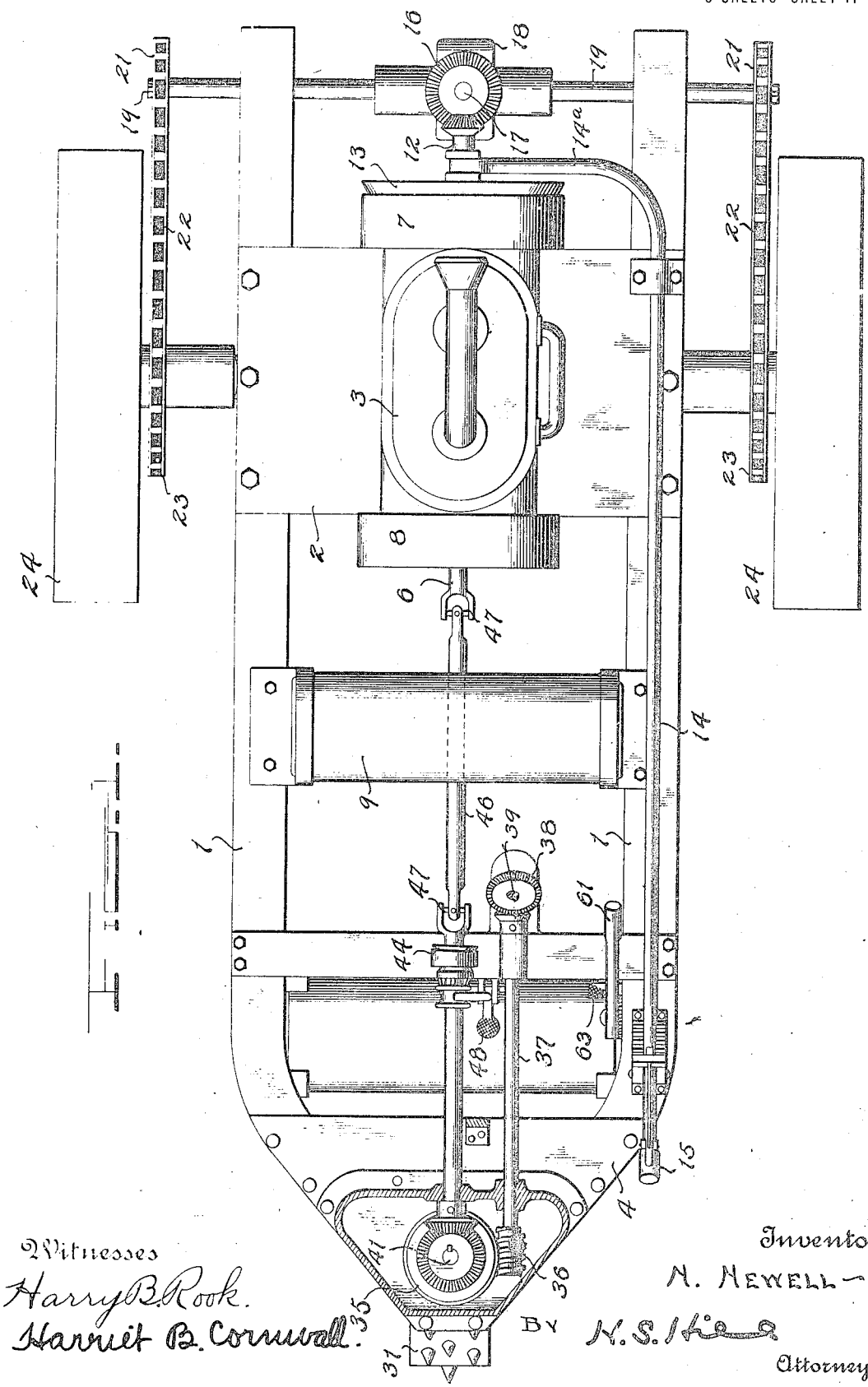

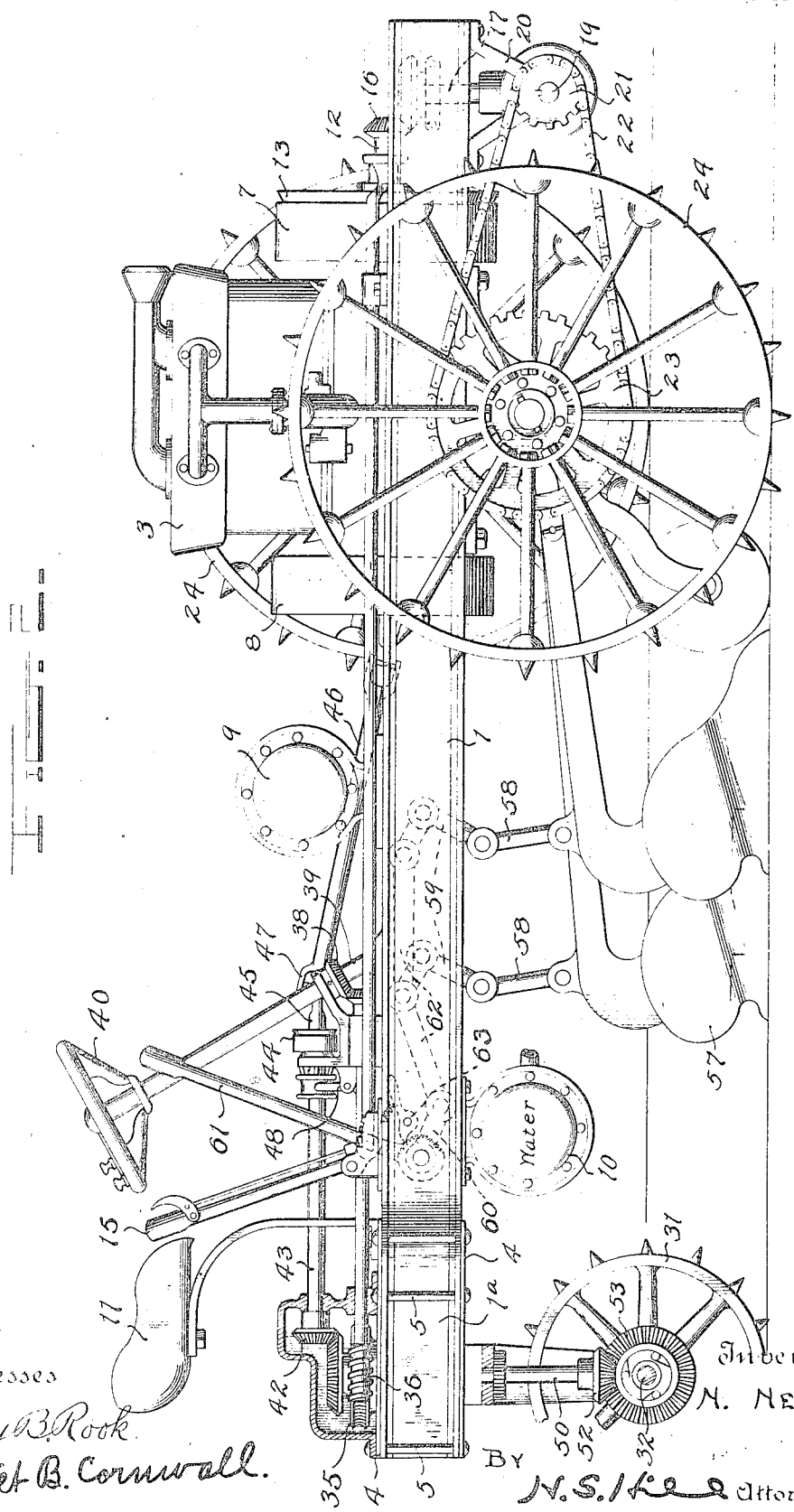

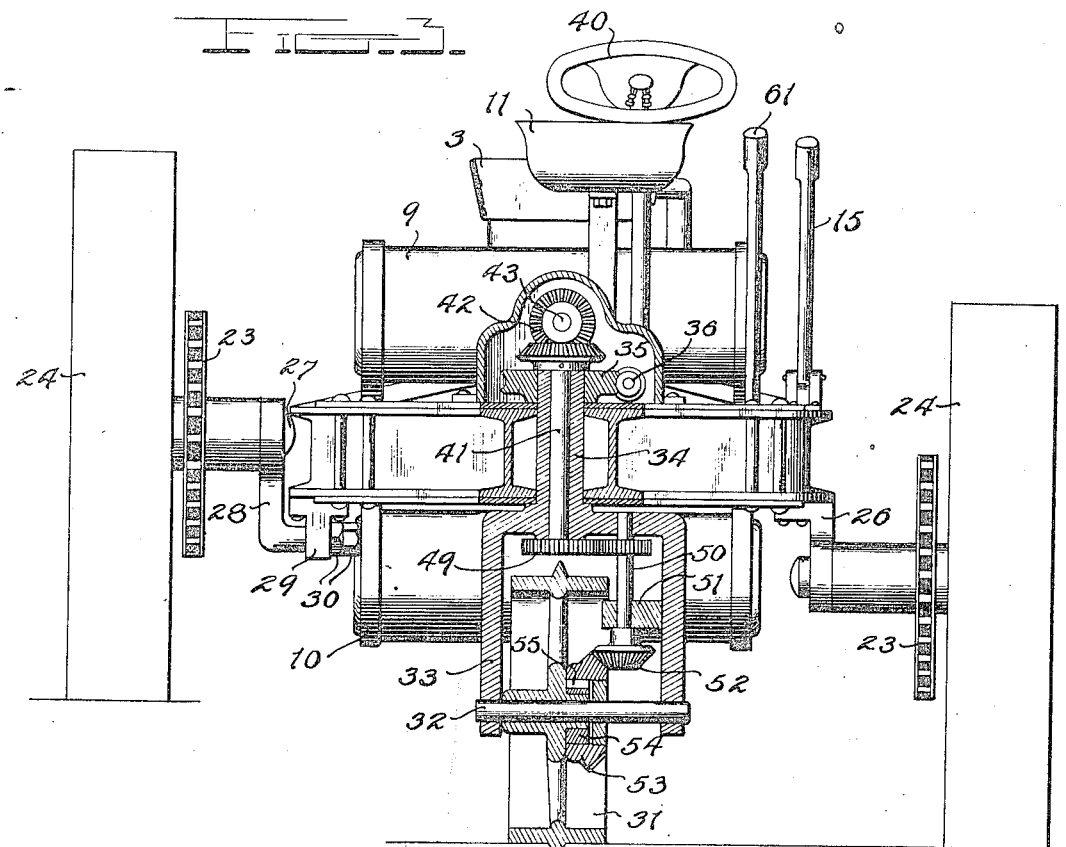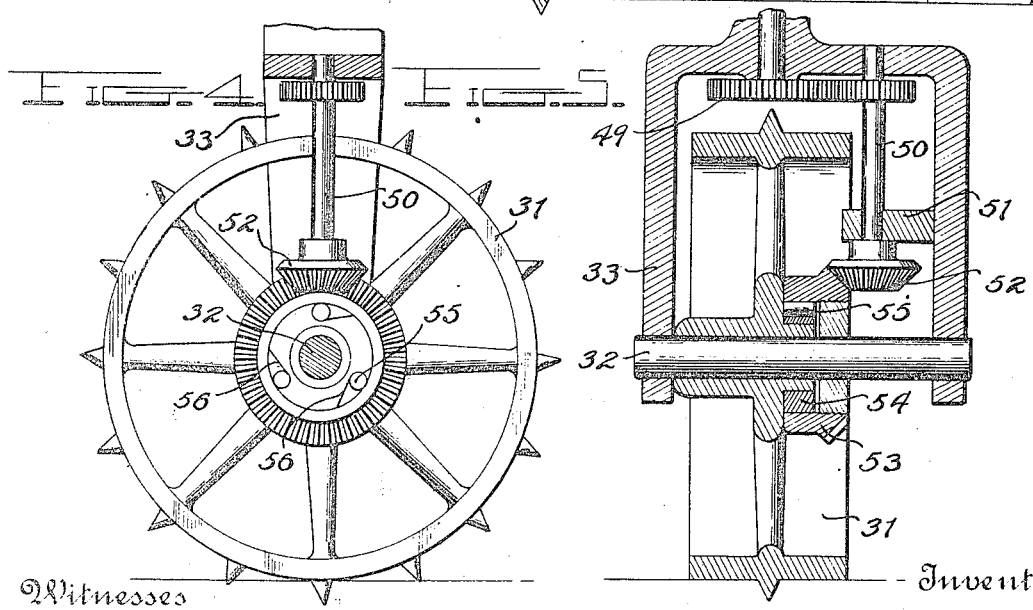

NAT NEWELL, OF ELKHART, INDIANA.

SQUARE-TURN TRACTOR.

1,175,553.  Specification of Letters Patent.  Patented Mar. 14, 1916.

Application filed June 6, 1914. Serial No. 843,437.

*To all whom it may concern:*

Be it known that I, NAT NEWELL, citizen of the United States, residing at Elkhart, in the county of Elkhart and State of Indiana, have invented certain new and useful Improvements in Square-Turn Tractors, of which the following is a specification.

The present invention relates to certain new and useful improvements in tractors such as are more particularly designed for use in plowing fields and performing similar agricultural operations, the object of the invention being to provide a tractor of this character which embodies novel features of construction whereby it can be turned squarely around at the end of the field without causing the main drive wheels to travel unnecessarily on plowed ground.

A further object of the invention is to provide a square turn tractor which is comparatively simple and inexpensive in its construction, which is at all times under the complete control of the operator, which can be used economically and effectively in plowing fields of comparatively small acreage, and which can be readily turned at the ends of the field without traveling upon plowed ground.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawings, in which:—

Figure 1 is a top plan view of a square turn tractor constructed in accordance with the invention, portions being broken away and shown in section to illustrate more clearly the details of construction. Fig. 2 is a side elevation of the square turn tractor, portions being broken away and shown in section. Fig. 3 is a rear view of the tractor with portions broken away and shown in section. Fig. 4 is an enlarged longitudinal sectional view through the fork member within which the steering wheel is mounted, the stem at the upper end of the fork member being broken away, and Fig. 5 is an enlarged transverse sectional view through the fork member and steering wheel, the stem of the fork member being broken away.

Corresponding and like parts are referred to in the following description and indicated in all the views of the drawings by the same reference characters.

The main frame of the tractor may be of any suitable construction, although for the purpose of illustration it is shown in the present instance as formed of two spaced and longitudinally disposed I beams 1 which are connected toward the forward end of the tractor by a suitable platform or bed 2 upon which the engine 3 is mounted, the rear ends of the I beams being converged toward each other at 1ª and connected by the top and bottom plates 4. These plates 4 may be secured in position in any suitable manner as by means of the bolts or fastening members 5. The engine 3 which is mounted upon the bed 2 may be of any suitable construction, and the engine shaft 6 is provided with a fly wheel 7 at the forward end thereof, and also with a second fly wheel 8 at the rear end thereof. A suitable gasolene tank 9 is shown as mounted on the top of the main frame to the rear of the engine, while a suitable water tank 10 is shown as mounted under the main frame at a point to the rear of the gasolene tank 9 and slightly in front of the seat 11 which is provided at the rear end of the frame.

A short horizontal drive shaft 12 is arranged in front of the engine 3 and in alinement with the engine shaft 6. A suitable clutch 13 is provided for locking the short drive shaft 12 with the engine shaft, said clutch being controlled by a lateral arm 14ª upon a slide 14 which extends along the top of the main frame at one side thereof and is connected to a clutch lever 15 arranged adjacent to the operator's seat 11 so as to be conveniently manipulated by a person sitting upon the same.

The front end of the short horizontal shaft 12 is connected by the bevel gearing 16 to a short vertical shaft 17 which extends downwardly and is connected by some conventional form of differential gearing 18 to a transverse jack shaft 19 which is journaled upon suitable brackets 20. Opposite ends of the transverse jack shaft 19 are provided with small sprocket wheels 21 which are connected by sprocket chains 22 to large sprocket wheels 23 upon the main traction or drive wheels 24, one of which is arranged at each side of the main frame. It will thus be obvious that when the clutch 13 is closed so as to lock the short horizontal drive shaft 12 with the engine shaft, power will be transmitted from the engine to the main traction wheels 24 so as to rotate the same and propel the tractor.

The two traction wheels 24 are designed to be arranged at different elevations so that one of the wheels will travel upon unplowed ground, while the other wheel will travel in a furrow. By reference to Fig. 3, it will be observed that one of the traction wheels 24 is mounted upon an axle which is carried by a bracket 26 and has a fixed position, while the opposite wheel 24 is mounted upon an axle 27 which is carried by the arm of a crank member 28, the opposite arm of the crank member being adjustable within a bracket 29 and held rigidly in an adjusted position by clamping nuts 30. With this construction it will be obvious that by swinging the crank member 28 up and down the traction wheel 24 upon the axle 27 can be raised or lowered as found necessary.

A single guide or caster wheel 31 is provided at the rear end of the tractor, the said wheel 31 being normally loose upon a shaft 32 which connects the two arms of a fork 33. Projecting upwardly from the fork 33 and arranged directly over the center of the guide wheel 31 is a tubular stem 34 which is suitably journaled upon the before mentioned plates 4 so as to be turned about a vertical axis. The upper end of the tubular stem 34 is provided with a worm wheel 35 which meshes with a worm 36 upon a horizontal shaft 37 which extends forwardly and is connected by suitable gearing 38 to the shaft 39 of a steering wheel 40. The guide wheel 31 normally follows in one of the furrows, although when turning the tractor this guide wheel 31 must be manipulated and thrown at an angle, and this is readily accomplished through the gearing just described by turning the steering wheel 40.

Extending axially through the tubular stem 34 of the fork 33, and journaled within the said stem is a vertical shaft 41, the upper end of which is connected by the bevel gearing 42 to a forwardly extending horizontal shaft 43 which is connected by a suitable clutch 44 to a short shaft 45. An inclined shaft 46 connects the short shaft 45 to the rear end of the engine shaft 6, suitable universal joints 47 being provided at opposite ends of the shaft 46. The clutch 44 is normally open and is controlled by a foot lever 48.

The lower end of the vertical shaft 41 which is journaled within the tubular stem of the fork is connected by the gearing 49 to a countershaft 50 which extends downwardly on one side of the guide or caster wheel 31 and is journaled upon the top of the fork and a lateral arm 51 projecting from one of the arms thereof. The lower end of the vertical countershaft 50 is connected by the bevel gearing 52 to a clutch sleeve 53 which is mounted upon a collar 54 applied to the hub of the guide wheel 31, conventional clutch rollers 55 being arranged within cam recesses 56 in the periphery of the collar 54 so as to permit the guide wheel 31 normally to turn freely, but lock the sleeve 53 with the collar 54 and guide wheel 31 when power is transmitted from the engine through the gearing.

Plows 57 are suitably connected to the forward end of the main frame so as to trail behind the main traction wheels. These plows are connected by links 58 to bell crank levers 59, said bell crank levers being in turn connected to each other and to the crank arm 60 of an operating lever 61 by means of the links 62. It will thus be obvious that by manipulating the operating lever 61 the plows can be raised and lowered, and a suitable pawl and ratchet mechanism 63 is provided for locking the lever 61 in an adjusted position.

In the operation of the device one tractor wheel 24 runs in a furrow, while the other tractor wheel 24 runs on unplowed land. The guide or caster wheel 31 follows in the furrow made by the second plow of the tractor. The plows are attached close to the tractor wheels so that the furrow turned over by the first plow just misses the furrow tractor wheel. When the end of the field is reached and it is desired to turn the tractor completely around, the operator manipulates the lever 15 to open the clutch 13 and shut off power from the main tractors 34. The guide or caster wheel 31 is at the same time turned into a position at substantially right angles to the direction in which the tractor has been traveling, this being accomplished by suitably rotating the steering wheel 40. The operator next closes the clutch 44 by pressing his foot upon the foot lever 48 and thereby transmits power from the engine to the vertical countershaft 50 of the fork 33 and the sleeve 53. The rotation of this sleeve 53 by power from the engine moves the roller clutches 55 into operative position so that the guide wheel 31 is positively driven from the engine. This serves to swing the entire tractor squarely around without the necessity of causing the main frame tractor wheels 24 to travel upon plowed ground. When the tractor is completely turned around, the guide wheel 31 is again turned into a position parallel to the line of movement of the tractor, the clutch 44 opened, and the clutch 13 again closed. This operation is repeated at each end of the furrow, and with the present construction short and square turns can be made without running the heavy drive wheels over plowed ground.

Having thus described the invention, what

I claim as new and desire to secure by Letters Patent, is:—

A tractor including a frame, a fork formed with an upright tubular stem which has a pivotal connection with the frame, a horizontally disposed axle connecting the arms of the fork, a main wheel mounted upon the axle, a gear wheel mounted upon the axle and having a clutch connection with the main wheel so that the latter can turn in one direction independently of the gear wheel, an upright shaft extending through the tubular stem and journaled therein, an upright countershaft arranged within the arms of the fork and journaled upon the fork at one side of the main wheel, gearing between the upper end of the countershaft and the lower end of the upright shaft, a gear wheel rigid with the lower end of the countershaft and meshing with the before mentioned gear wheel mounted upon the axle and having a clutch connection with the main wheel, means for applying power to the upper end of the upright shaft, and gearing applied to the tubular stem for rotating the fork.

In testimony whereof I affix my signature in presence of two witnesses.

NAT NEWELL.

Witnesses:
EDWARD B. ZIGLER,
T. A. KOSKY.